(12) United States Patent
Olshanetckii et al.

(10) Patent No.: US 9,639,566 B2
(45) Date of Patent: May 2, 2017

(54) METHOD, APPARATUS AND COMPUTER PROGRAM PRODUCT FOR IMPROVED STORAGE OF KEY-VALUE PAIRS

(71) Applicant: HERE Global B.V., Veldhoven (NL)

(72) Inventors: Oleg Olshanetckii, Chicago, IL (US); Hongming Liu, Park Ridge, IL (US)

(73) Assignee: HERE Global B.V., Veldhoven (NL)

( * ) Notice: Subject to any disclaimer, the term of this patent is extended or adjusted under 35 U.S.C. 154(b) by 316 days.

(21) Appl. No.: 14/574,737

(22) Filed: Dec. 18, 2014

(65) Prior Publication Data

US 2016/0179802 A1 Jun. 23, 2016

(51) Int. Cl.
*G06F 17/30* (2006.01)

(52) U.S. Cl.
CPC .... *G06F 17/3033* (2013.01); *G06F 17/30424* (2013.01)

(58) Field of Classification Search
CPC ......... G06F 17/30091; G06F 17/30094; G06F 17/301; G06F 17/3033
USPC ................. 707/741, 747; 711/216
See application file for complete search history.

(56) References Cited

U.S. PATENT DOCUMENTS

| | | | |
|---|---|---|---|
| 7,424,477 B1 | 9/2008 | Martin et al. | |
| 7,903,819 B2* | 3/2011 | Gupta | G06F 17/30336 380/277 |
| 8,433,695 B2 | 4/2013 | Wu et al. | |
| 2003/0195873 A1* | 10/2003 | Lewak | G06F 17/30389 |
| 2004/0225865 A1* | 11/2004 | Cox | G06F 17/30477 712/34 |
| 2010/0217953 A1* | 8/2010 | Beaman | G06F 12/109 711/216 |
| 2013/0226931 A1* | 8/2013 | Hazel | G06F 17/30094 707/741 |
| 2014/0032527 A1* | 1/2014 | Chambers | G06F 9/3885 707/717 |
| 2014/0201247 A1* | 7/2014 | Kirazci | G06F 17/30961 707/803 |
| 2014/0237159 A9 | 8/2014 | Flynn et al. | |
| 2015/0370794 A1* | 12/2015 | Yochai | G06F 17/30097 707/747 |

OTHER PUBLICATIONS

CB, *Java Development without GC—Coral Blocks*[online] [retrieved Mar. 2, 2015]. Retrieved from the internet: <URL: http://www.coralblocks.com.index.php/2014/05/java-development-without-gc/>. (dated May 2, 2014) 7 pages.
*Collections—Is there a HashMap implementation in Java that produces no garbage?—Stack Overflows* [online] [retrieved Feb. 27, 2015]. Retrieved from the internet: <URL: http://stackoverflow.com/questions/23828425/is-there-a-hashmap-implementation-in-java-that-produces-no-garbage (dated May 23, 2014) 3 pages.

* cited by examiner

*Primary Examiner* — Dennis Truong
(74) *Attorney, Agent, or Firm* — Alston & Bird LLP

(57) ABSTRACT

A method, computer program product and apparatus provide an improved data structure for storing key-value pairs. The data structure comprises six arrays. The method, computer program product and apparatus provide for efficient searching, adding, removal, and iteration of elements. The data structure utilizes a scaled hash code and may store multiple values associated with a same scaled hash code. The required memory is allocated at the time of instantiation, resulting in improved performance. An insertion time of a new key-value pair is a linear function of the total number of key-value pairs.

20 Claims, 10 Drawing Sheets

| keys | | startKeyIndex | | nextKeyIndex | | lastValueIndex | | values | | prevValueIndex | |
|---|---|---|---|---|---|---|---|---|---|---|---|
| # | key | # | start | # | next | # | start | # | value | # | next |
| 0 | - | 0 | - | 0 | - | 0 | - | 0 | - | 0 | - |
| 1 | $K_1$ | 1 | - | 1 | 0 | 1 | - | 1 | $V_1$ | 1 | 0 |
| 2 | $K_2$ | ... | ... | 2 | - | 2 | - | ... | ... | ... | ... |
| ... | ... | j | i | ... | ... | ... | k | k | $V_2$ | k | 1 |
| i | $K_i$ | ... | ... | i | 2 | i | l | ... | ... | ... | ... |
| ... | ... | ... | ... | ... | ... | ... | ... | l | $V_3$ | l | 0 |
| N | | L-1 | | N | | N | | M | | M | |
| 1st array | | 2nd array | | 3rd array | | 4th array | | 5th array | | 6th array | |

Figure 3

METHOD, APPARATUS AND COMPUTER PROGRAM PRODUCT FOR IMPROVED STORAGE OF KEY-VALUE PAIRS

TECHNOLOGICAL FIELD

An example embodiment of the present invention relates generally to data structures, and more particularly, to a method, apparatus and computer program product for providing an improved data structure for storing key-value pairs.

BACKGROUND

The development of modern computing technology has led to vast amounts of stored data. In some examples, modern systems require maintaining hundreds of millions, or even more, data values. Retrieval of the desired data may require searching for a desired key among the data and may require a large volume of operations to determine the associated value. Typical operations include searching among the data values and determining associations between keys and related values. In this regard, a key-value pair may include a key by which a requesting service or method may request an associated value. Depending on the data structure, the data is searched and processed such that an associated value is returned to the requesting service or method.

Java Multimap is an example data structure used to maintain large amounts of key-value pairs. The Multimap maps each key $k_i$ from the set $(k_1, \ldots, k_n)$ to a sequence of values $[v_1, \ldots, v_{m_i}]$ of various size. However, the Java Multimap, as well as many other data structures may experience decreased performance as the size or amount of values stored in the data structure increase. Searching, as well as adding and removing key-value pairs may have a detrimental effect on performance, particularly as the amount of data increases.

FIG. 1 is a plot illustrating insertion times of various data structures including JDK (Java Development Kit) 1.7 HashMap, Guava 18.0 Multimap, Apache Commons 4.0 Multimap, Trove 3.0.3, CERN (European Organization for Nuclear Research) Colt 1.2.0, HighScale Lib 1.1.2, HPPC (High Performance Primitive Collections for Java) 0.6.0, Javolution 6.1.0 and Primitive Collections 1.2 for Java or PCJ (Pluggable Java Collections). Results are shown for 1 gigabyte of free memory provided to each data structure. Computations performed to gather the data were performed on Intel Pentium i7 950 3.0 GigaHertz (GHz) (4Core) having 6 gigabytes of random access memory (RAM). As illustrated in the plot, insertion times and performance are impacted significantly when the data structures store large amounts of key-value pairs. Particularly in these examples, many implementations experience significant performance degradation as the number of key-value pairs approaches and/or exceeds 5 million key-value pairs per gigabyte. Many modern computing systems require an even higher volume of data to be processed with less memory.

Furthermore, many implementations of data structures are based on mappings of keys to dynamic arrays of values, requiring dynamic allocations of objects during the addition and removal of elements. The final sizes of sets of values associated with keys in such data structures may be unknown at the time of creation or instantiation, which may cause further performance degradation with respect to reallocations, particularly when more values are added.

In Java, allocations in MultiMap are managed by a Garbage Collector (GC) and when the amount of allocations becomes large, the GC must track many objects. For example, each time a new object is added or removed, the GC may instantiate and/or track numerous objects, resulting in the performance degradation. Furthermore, memory fragmentation may also cause reallocations of objects within the heap, which may add even more time and usage of computing resources for the completion of operations.

BRIEF SUMMARY

A method, apparatus, and computer program product are therefore provided for providing an improved data structure for storing key-value pairs. The data structure described herein comprises at least six arrays, and will be referred to herein as a six-array multimap.

A computer program product is provided. The computer program product includes at least one non-transitory computer-readable storage medium having computer-executable program code instructions stored therein, with the computer-executable program code instructions comprising program code instructions to receive an indication of a key for which to identify a corresponding value. The key is an element associated with a key index of a first array. The computer program product calculates a scaled hash code of the key, and accesses a second array to identify a third array start index based on the calculated scaled hash code. The computer program code traverses a plurality of key indices in the third array to determine the key index with which the key is associated, wherein the traversal begins from the identified third array start index. The computer program code accesses a fourth array based on the determined key index to identify a last value index of a list of values in a fifth array, and traverse a plurality of value indices in a sixth array, beginning at the identified last value index, to determine an actual value index by which to access the corresponding value in the fifth array.

In some examples, each key index of the plurality of traversed key indices in the third array has an associated key having a same scaled hash code as the calculated scaled hash code, and the traversal continues until an instance that an arbitrary key accessed in the first array based on the traversed key index equals the key.

In some examples, each value index of the plurality of traversed value indices of the sixth array have associated values in the fifth array that are associated with the key.

In some embodiments, a number of elements in the first array is one greater than a number of unique keys, and a number of elements in the fifth array is one greater than the number of unique values.

In some embodiments, the computer-executable program code instructions further comprise program code instructions to receive an indication of a new key-value pair to be added and add a new value to the fifth array in a position based on a freeValuePosition pointer. The computer program code updates any of the first array, second array, third array, fourth array, or sixth array accordingly.

In some embodiments, the computer-executable program code instructions further comprise program code instructions to receive an indication of a specified key for which the specified key and associated values of the specified key are to be removed, and update any of the first array, second array, third array, fourth array, fifth array or sixth array such that a search for the specified key returns no results.

In some examples, an insertion time of a new key-value pair is a linear function of a total number of key-value pairs.

An apparatus is also provided. The apparatus includes at least one processor and at least one memory including computer program code, with the at least one memory and the computer program code configured to, with the processor, cause the apparatus to at least receive an indication of a key for which to identify a corresponding value, wherein the key is an element associated with a key index of a first array. The apparatus is further caused to calculate a scaled hash code of the key and access a second array to identify a third array start index based on the calculated scaled hash code. The apparatus is caused to traverse a plurality of key indices in the third array to determine the key index with which the key is associated, wherein the traversal begins from the identified third array start index, access a fourth array based on the determined key index to identify a last value index of a list of values in a fifth array, and traverse a plurality of value indices in a sixth array, beginning at the identified last value index, to determine an actual value index by which to access the corresponding value in the fifth array.

In some examples, the at least one memory and the computer program code are further configured to, with the processor, further cause the apparatus to at least receive an indication of a new key-value pair to be added, and add a new value to the fifth array in a position based on a freeValuePosition pointer. The apparatus is further caused to update any of the first array, second array, third array, fourth array, or sixth array accordingly.

In some examples, the at least one memory and the computer program code are further configured to, with the processor, cause the apparatus to at least receive an indication of a key-value pair to be stored, remove at least one value from the fifth array, and update any of the first array, second array, third array, fourth array, or sixth array accordingly.

A method is also provided, including receiving an indication of a key for which to identify a corresponding value. The key is an element associated with a key index of a first array. The method further includes, with a processor, calculating a scaled hash code of the key, and accessing a second array to identify a third array start index based on the calculated scaled hash code. The method further includes traversing a plurality of key indices in the third array to determine the key index with which the key is associated, wherein the traversal begins from the identified third array start index and accessing a fourth array based on the determined key index to identify a last value index of a list of values in a fifth array. The method additionally includes traversing a plurality of value indices in a sixth array, beginning at the identified last value index, to determine an actual value index by which to access the corresponding value in the fifth array.

In some examples, the method includes receiving an indication of a new key-value pair to be added, adding a new value to the fifth array in a position based on a freeValuePosition pointer, and updating any of the first array, second array, third array, fourth array, or sixth array accordingly.

In some embodiments, the method further includes receiving an indication of a key-value pair to be stored, removing at least one value from the fifth array, and updating any of the first array, second array, third array, fourth array, or sixth array accordingly.

An apparatus is provided, including means for receiving an indication of a key for which to identify a corresponding value. The key is an element associated with a key index of a first array. The apparatus further includes means for calculating a scaled hash code of the key, and means for accessing a second array to identify a third array start index based on the calculated scaled hash code. The apparatus further includes means for traversing a plurality of key indices in the third array to determine the key index with which the key is associated, wherein the traversal begins from the identified third array start index and accessing a fourth array based on the determined key index to identify a last value index of a list of values in a fifth array. The apparatus additionally includes means for traversing a plurality of value indices in a sixth array, beginning at the identified last value index, to determine an actual value index by which to access the corresponding value in the fifth array.

BRIEF DESCRIPTION OF THE DRAWINGS

Figure 1:
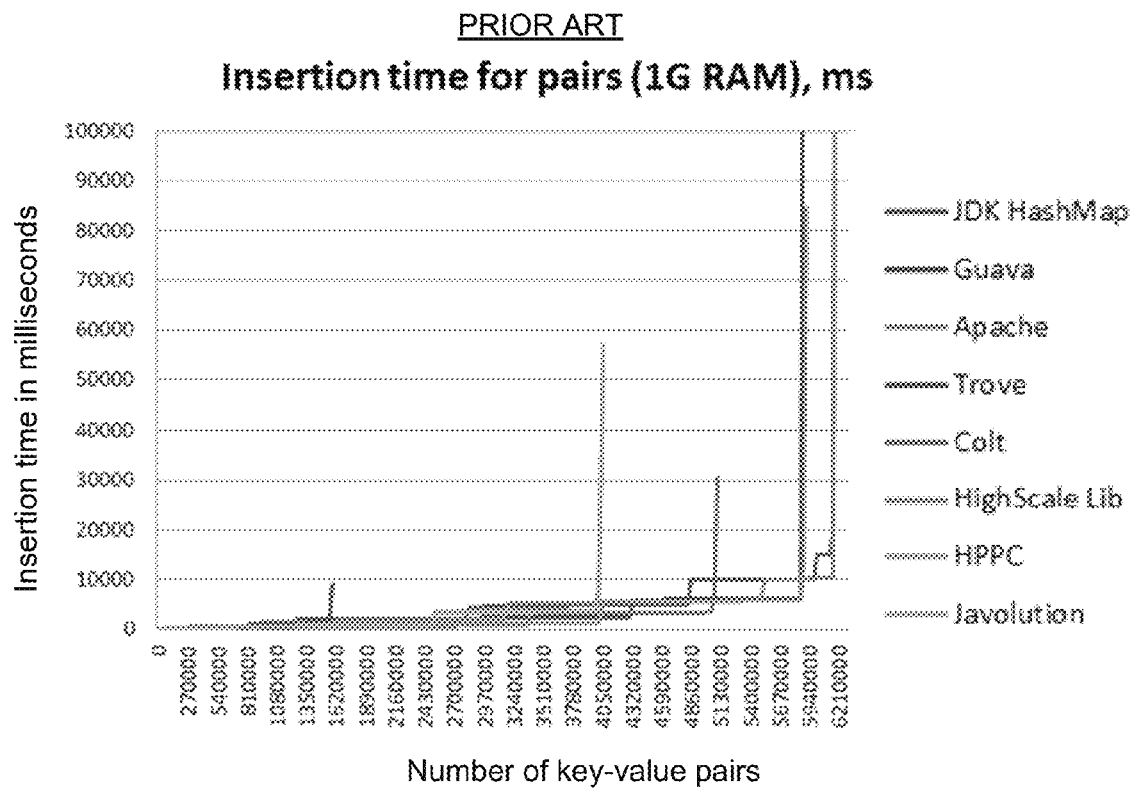
Figure 2:
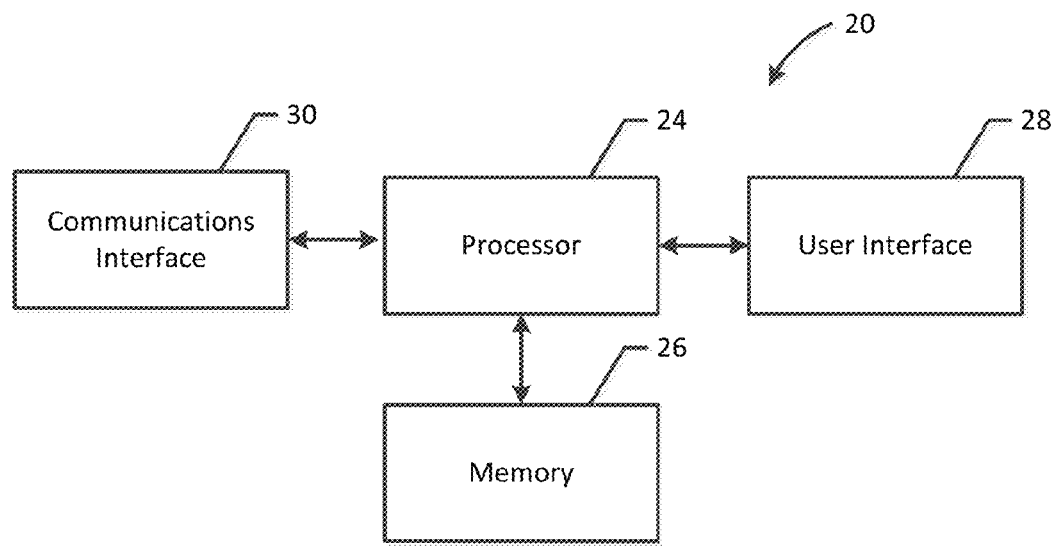
Figure 4:
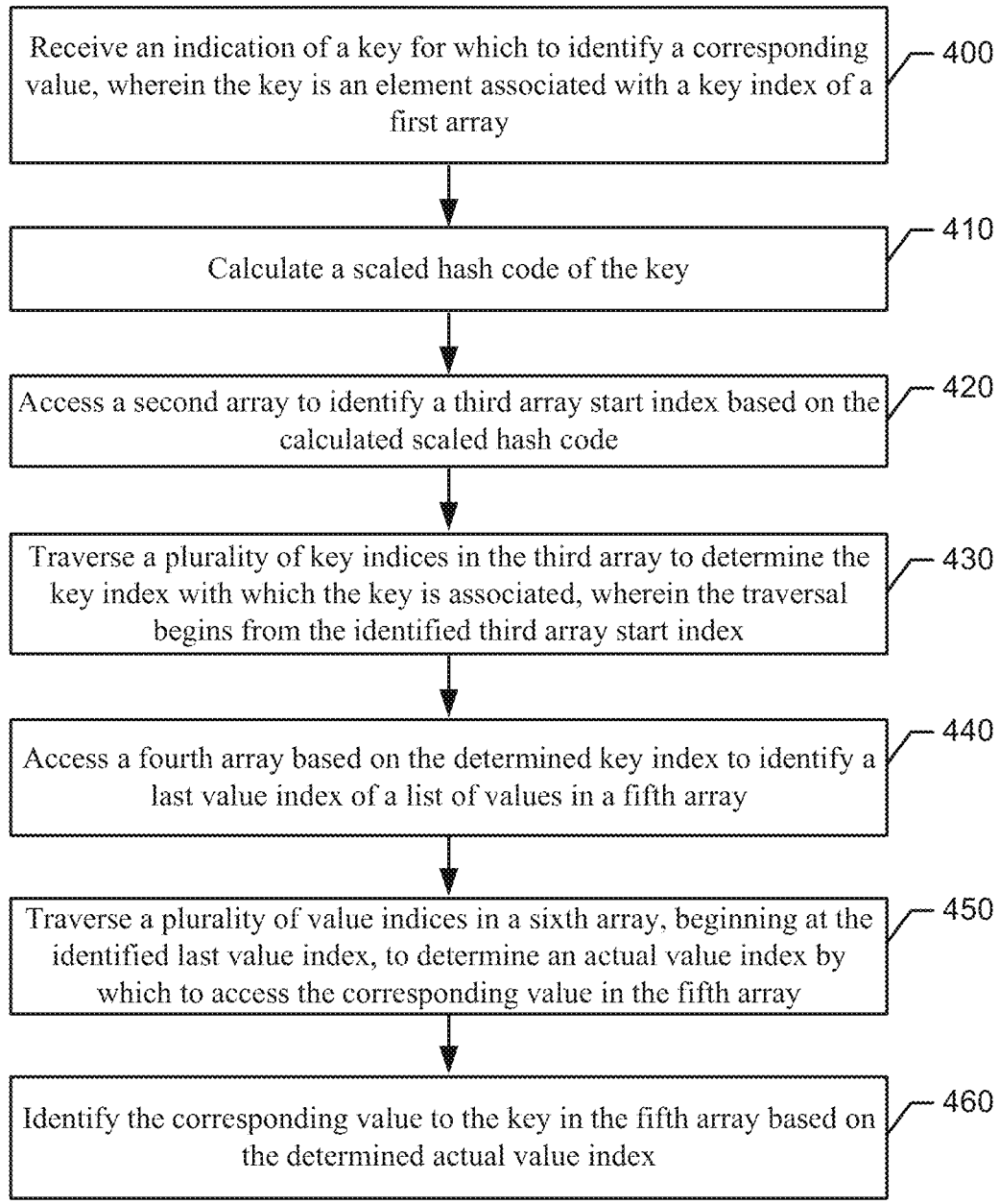
Figure 9:
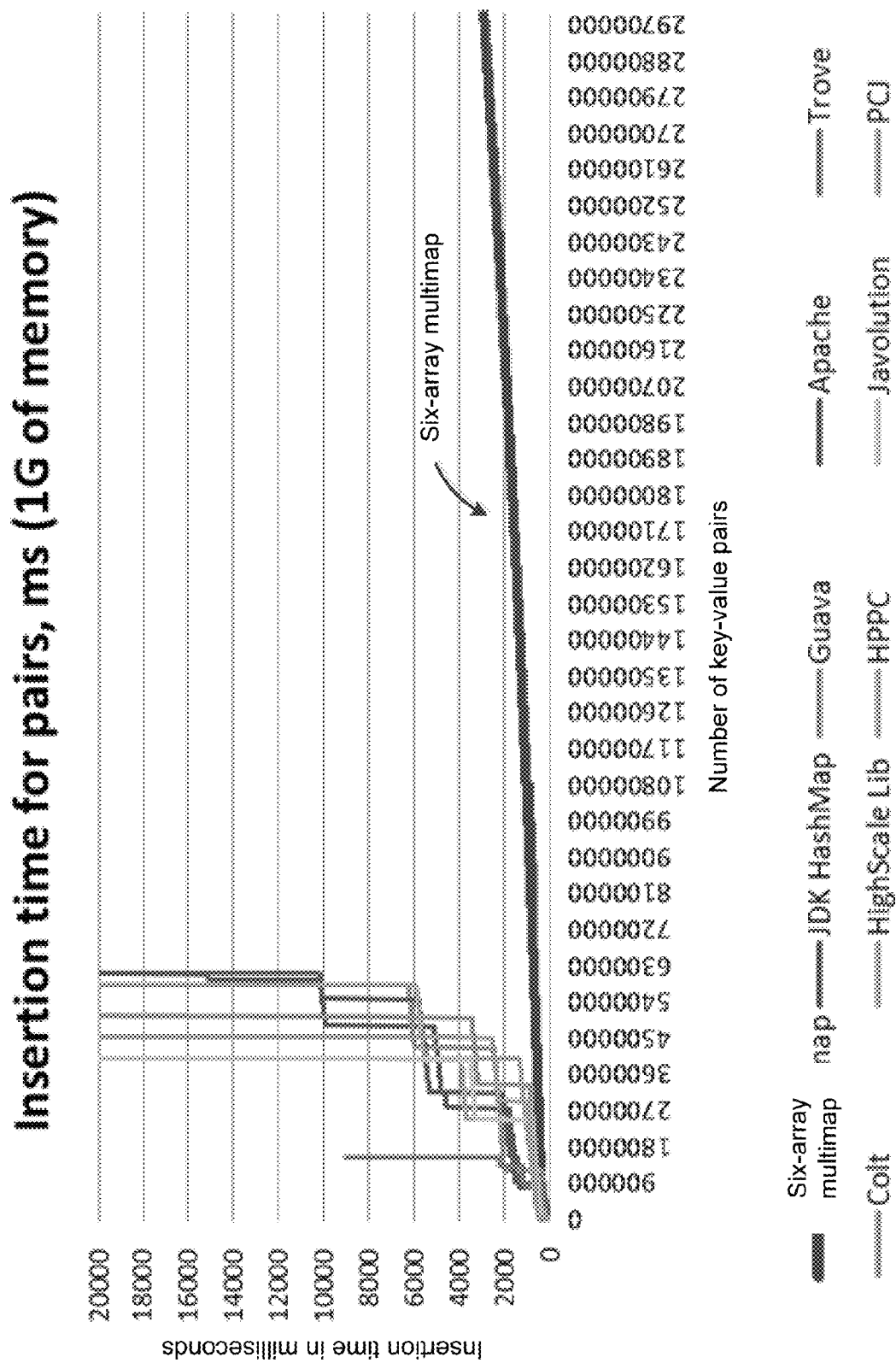
Figure 10:
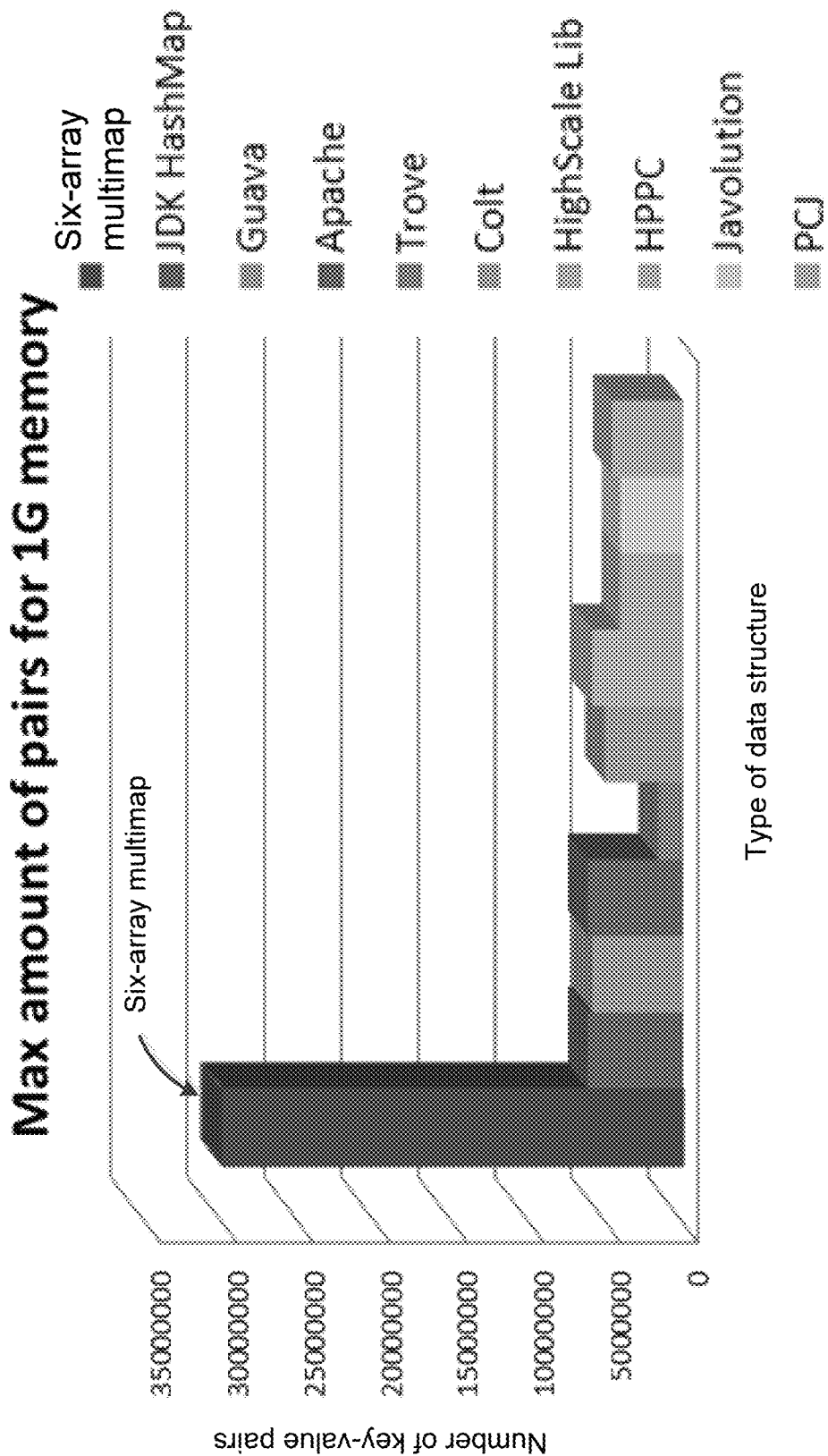

Having thus described certain example embodiments of the present invention in general terms, reference will hereinafter be made to the accompanying drawings which are not necessarily drawn to scale, and wherein:

FIG. 1 is an illustration of insertion times of key-value pairs according to prior art techniques;

FIG. 2 is a block diagram of an apparatus according to an example embodiment of the present invention;

FIG. 3 is an example memory allocation, or portion thereof, according to an example embodiment of the present invention;

FIG. 4 is a flowchart of operations for searching for a value in a six-array multimap according to an example embodiment;

FIGS. 5A, 5B and 6-8 are example memory allocations, or portions thereof, according to an example embodiment;

FIG. 9 is an illustration of insertion times of key-value pairs according to an example embodiment and in comparison to prior art techniques; and FIG. 10 is an illustration of a maximum number of key-value pairs stored in 1 gigabyte of memory according to an example embodiment and in comparison to prior art techniques.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing an improved data structure, namely a six-array multimap. In this regard, a service, method, or computer program product requesting a specified value in the six-array multimap provides a key (for example, as a parameter in a retrieval method) to access the desired associated value. The six-array multimap may provide performance improvements in comparison to other data structures and methods for storing key-value pairs.

Many observations are considered in the implementation of the six-array multimap. First, in many examples, the set of all keys is unknown until all pairs are added to the data structure. Associations $(key_i \rightarrow [v_1, v_2, \ldots, v_{n_i}])$ are added by pairs $(key_m, v_k)$ in an unpredictable sequence. The maximum length of an array $[v_1, \ldots, v_k]$ cannot be calculated until all pairs are added.

In general, the use of the six-array multimap avoids allocations of new objects during operations such as add, remove, search, and iterate. The six-array multimap may be implemented in Java, for example. The six-arrays may be arrays of primitive types, such as Long, and may be allocated when the six-array multimap is instantiated. Further operations may be performed using the six arrays and may not require any new allocations and/or memory fragmentation. The use of primitive data types provides improved performance because population of non-primitive array elements requires dynamic allocation and results in detrimental impacts to performance. While referred to throughout as a six-array multimap, it will be appreciated that in some examples, embodiments may include additional arrays or data structures.

FIG. 2 is a block diagram of an apparatus that may be configured to implement a six-array multimap according to an example embodiment. The apparatus 20 of an example embodiment may be embodied by or associated with any of a variety of computing devices that include memory for facilitating storage of the six-array multimap. For example, the computing device may comprise one or more servers, a server cluster, one or more network nodes, chip, chipset, or some combination thereof, or the like. In some examples, the apparatus 20 may be implemented as a database, data repository, data warehouse, and/or the like. Various system and/or services may communicate with the apparatus 20 to retrieve the desired data. Alternatively, the computing device may be a user device, such as a mobile device, laptop, personal computer, a computer workstation, a kiosk or the like. Still further, the apparatus may be embodied by or associated with a plurality of computing devices that are in communication with or otherwise networked with one another such that the various functions performed by the apparatus may be divided between the plurality of computing devices that operate in collaboration with one another to form a cloud computing infrastructure.

The apparatus may include, be associated with or otherwise in communication with a processor 24 and a memory 26. In some examples, a user interface 28 and/or communications interface 30 may be optionally included. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store the six arrays, as well as instructions for execution by the processor. In this regard, processor 24 may perform operations provided by memory 26 to retrieve, add, and delete values from the six-array multimap.

As noted above, the apparatus 20 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory 26, and/or the like).

The apparatus 20 of an example embodiment may also optionally include a communications interface 30 that may be any means such as a device or circuitry embodied in either hardware or a combination of hardware and software that is configured to receive and/or transmit data from/to other electronic devices in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. For example, the communications interface 30 may be configured to provide a value based on a lookup-up index to a requesting service or system.

Referring now to FIG. 3, an example memory allocation of a six-array multimap, such as may be stored in memory 26, is provided. The six arrays are two-dimensional arrays on which the processor 24 may operate to provide for efficient storage, retrieval, and maintenance of key-value pairs. Indices of each respective array of FIG. 3 appear on the left, and their associated elements on the right. Two-dimensional arrays are provided as an example, but it will be appreciated arrays of more than two dimensions may also be used.

In general, the first array, keys, is an array of keys. The second array, startKeyIndex, is an array of start indices of lists of key indices of keys having the same hash code. Such lists are provided in the third array, nextKeyIndex. In this regard, the third array may be considered a linked list of elements that are the key indices and/or that may reference other elements in the third array. The elements of the third array may be linked in a manner that enables traversal of the lists of key indices having an associated key with the same hash code.

The fourth array, lastValueIndex, provides elements that are indices by which to reference the last value index in a list of value indices. The fifth array, values, comprises elements that are the values requested by calling services, methods, and/or the like based on an associated key. The sixth array, prevValueIndex, may be considered a linked list of elements that are value indices and/or that may reference other elements in the sixth array. The sixth array may therefore be traversed in a manner so as to access a list of value indices of values having the same associated key. Use of the six-array multimap for storage and retrieval of key-value pairs is described in detail hereinafter.

Figure 5A:
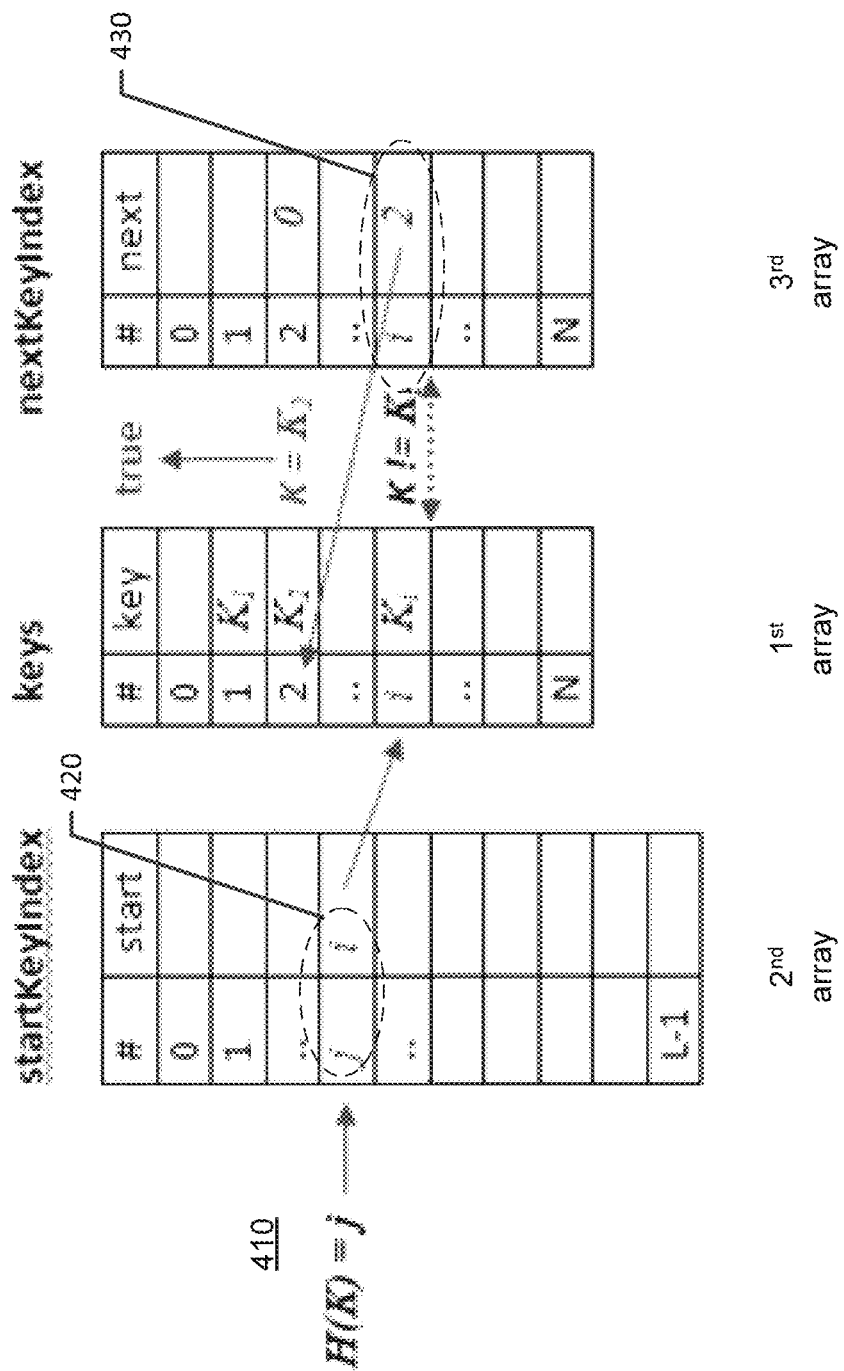
Figure 5B:
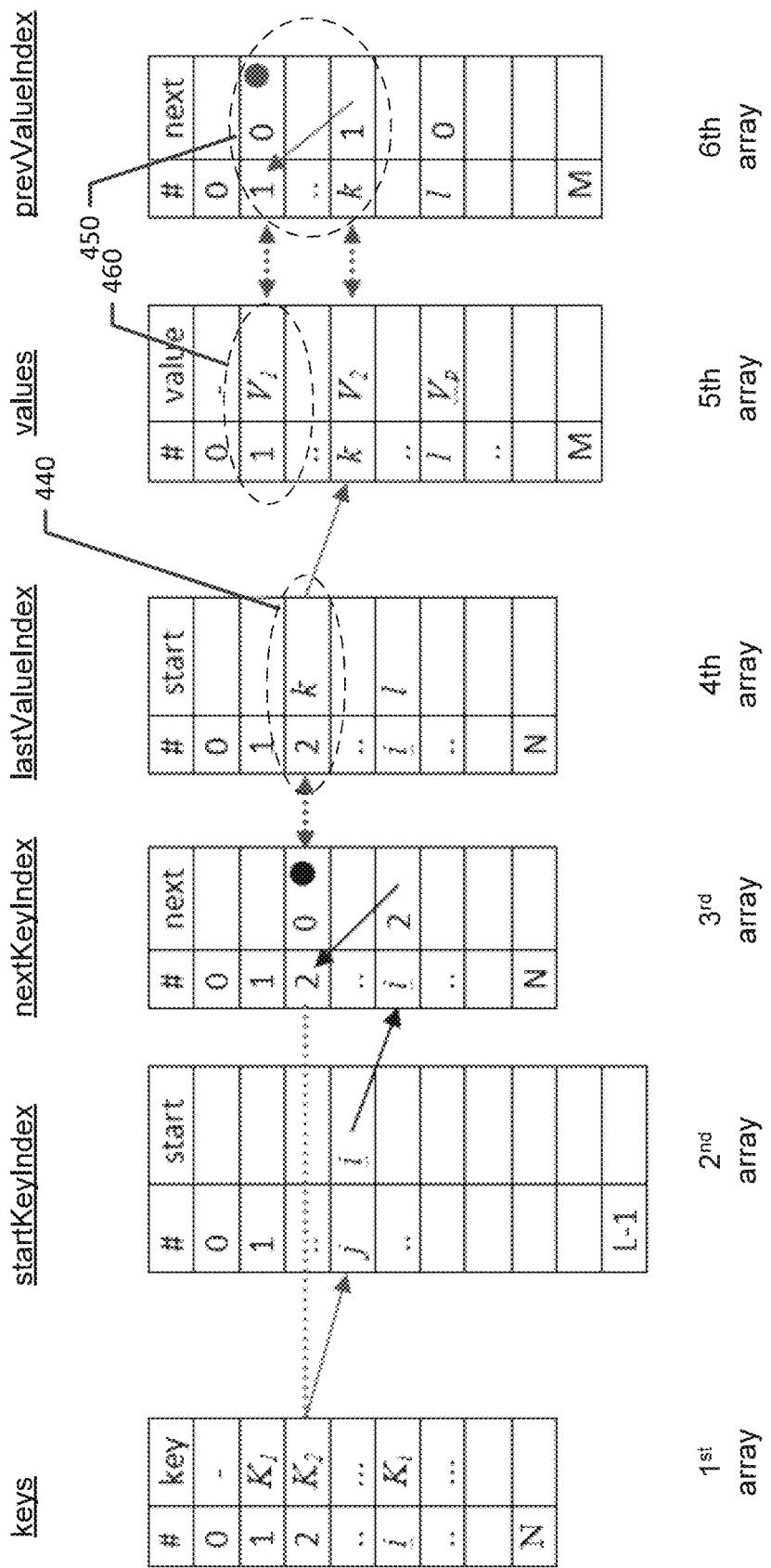

Having now briefly described the six arrays, FIG. 4 illustrates operations for performing a search for a particular value based on a key, such as may be performed by the apparatus 20, in accordance with an example embodiment of the present invention. Reference is also made to FIGS. 5A and 5B, which illustrate traces through the six-array multimap to determine the requested value. Some indicators of operations of FIG. 4 are also indicated on areas of relevancy of the six-array multimap of FIGS. 5A and FIG. 5B, for illustrative purposes.

As shown by operation 400, apparatus 20 may include means, such as processor 24, communications interface 30, and/or user interface 28, for receiving an indication of a key for which to identify a corresponding value. In this regard, a requesting service or method, may request a corresponding value based on the key, which may be provided as a parameter in a request, for example. As another example, when apparatus 20 is implemented as a user device, a user may enter a key via a user interface 28 to access the corresponding value. The key is an element associated with a key index of the first array. However, at the time of the request, the key index is unknown to the processor 24 and must be determined to retrieve the associated value. As described below, operations 410, 420, and 430 are performed while utilizing the first, second, and third arrays to determine the key index of the provided key.

As shown by operation 410, the apparatus 20 may include means, such as processor 24 and/or memory 26, for calculating a scaled hash code associated with the key.

In the example of FIG. 5A, the processing of a received key K is illustrated. The processor may calculate a scaled hash code H(K). The algorithm for calculating the scaled hash code may be stored on memory 26, and may be defined by the six-array multimap implementation, and may be dependent on a mask value. In general, the hash code for a key may be calculated and scaled to a minimal amount of bits necessary to store an index of all expected keys. More detail regarding scaled hash code functions are described in further detail hereinafter. In the example of FIG. 5A, the calculated scaled hash code is j. The resulting scaled hash code maps to an index in the second array or startKeyIndex array.

As shown in operation 420 of FIG. 4, the apparatus 20 may comprise means, such as processor 22 and memory 26, for identifying a third array start index in a second array based on the calculated scaled hash code. In the example in FIG. 5A, the resulting scaled hash code of K is j. The processor 24 may then access the element at index j of the second array, the startKey Index array. The associated element is a start index by which to access the third array, and in the illustrated example, is i. In some examples (not illustrated), if the identified third array start index is zero, there are no stored values associated with the key, and the lookup process ends such that no search result is provided.

As shown in operation 430 of FIG. 4, the apparatus 20 may comprise means, such as processor 22 and memory 26, for traversing a plurality of key indices in the third array to determine the key index with which the key is associated. The traversal begins from the identified third array start index obtained in operation 420 (e.g., i). The traversal enables the processor 20 to access a list of key indices having an associated key having the same scaled hash code as the calculated scaled hash code. The traversal may continue until an instance in which the accessed key index has an associated key in the first array that equals the provided key K.

The following example algorithm or pseudo code provided in Table 1 illustrates the traversal operation 430 with respect to FIG. 5A, where keyIndex starts as startKeyIndex [j] (e.g., i).

TABLE 1

Traversal of key indices

| Operation | Notes |
|---|---|
| 1.1 Repeat 1.2-1.4 until true or false is returned | |
| 1.2 If keyIndex == 0 then return false | no value will be found - end |
| 1.3 if keys[keyIndex] equals K then return true | the keyIndex is identified - end |
| 1.4 else set keyIndex = nextKeyIndex[keyIndex] | continue traversal |

In FIG. 5A, keys[i]≠$K_2$, so keyIndex according to the above traversal algorithm is reset to nextKeyIndex[keyIndex] or nextKeyIndex[i], or 2. Now keys[2]=$K_2$, so the traversal ends. The key index of the requested key is now determined as 2.

Continuing to operation 440 of FIG. 4, the apparatus 20 may comprise means, such as processor 22 and memory 26, for accessing a fourth array based on the determined key index to identify a last value index of a list of values in a fifth array. The example of FIG. 5A is illustrated continuing in FIG. 5B. As illustrated in FIG. 5B with respect to operation 440, the value obtained from the fourth array, lastValueIndex is k.

Continuing to operation 450 of FIG. 4, the apparatus 20 may comprise means, such as processor 22 and memory 26, for traversing a plurality of value indices in a sixth array, beginning at the identified last value index from operation 440, to determine an actual value index by which to access the corresponding value in the fifth array. In the provided example and based on operation 440, the value index is initially set to k.

In general, the traversal of value indices is performed using three functions provided in Table 2:

TABLE 2

Subroutines of traversal of value indices

| Operation | Description |
|---|---|
| 2.1 getLastValueIndex(K) | returns last value index or 0 if K is not among keys |
| 2.2 getValueByIndex(index) | returns the value by specified index |

TABLE 2-continued

Subroutines of traversal of value indices

| Operation | Description |
|---|---|
| 2.3 getPrevValueIndex(index) | returns the index of previous value or 0 if it is first value for key K |

In general, Table 3 provides an example of how the value indices are traversed:

TABLE 3

Traversal of value indices

| | |
|---|---|
| 3.1 | while (index != 0) { |
| 3.2 | value = getValueByIndex(index); |
| 3.3 | index = getPrevValueIndex(index); } |

Note that the values are stored such that the values are stored in a last in, first out order, and therefore traversed in reverse order, which provides improved efficiency for insertions. When a new value is inserted into the six-array multimap, the new value may be inserted without needing to iterate the whole list of other values for the key.

As operation 450 and/or the above pseudo code applies to the example in FIG. 5B, the processor 24 accesses prevValueIndex[k], and determines the corresponding value index is 1. The list is traversed until the value of corresponding element of the sixth array, preValueIndex array, is zero. The processor may then obtain the actual value corresponding to the requested key from the fifth array, based on the determined actual value index, or final value of index in the above pseudo code, (e.g., index 1 in FIG. 5B.) Therefore, in the example of FIG. 5B, the corresponding value to the received key is values[1], or $V_1$, as indicated by operation 460. The value may then be returned to the calling service, method, function and/or user that requested the value.

The above description with respect to FIGS. 3, 4, 5A and 5B is provided as a description of how the six-array multimap map may be used to access a requested value based on a provided key. The following description provides information with regard to the instantiation of a six-array multimap and corresponding memory allocations, such as on memory 26, for example.

Assuming that storage of N keys is required, being mapped to sets of values having a total size of M values, the arrays should have the following minimum sizes as provided in Table 4:

TABLE 4

Array sizes

| | Array | Description | Size |
|---|---|---|---|
| 4.1 | First array | array of keys | N + 1 elements |
| 4.2 | Second array | array of start indices of list of keys | $2^k$ \| k = min (i, $2^i$ > N) elements. |
| 4.3 | Third array | array of indices of next key | N + 1 elements |
| 4.4 | Fourth array | array of last indices of list of values | N + 1 elements |
| 4.5 | Fifth array | array of values | M + 1 elements |
| 4.6 | Sixth array | array of indices of previous value | M + 1 elements |

Note that in defining the size of the second array, $2^k$≤2N, the total amount of required memory is linear to N despite a requirement for the length of the second array to be an integer power of 2 (e.g., an exponential expression). The size of the second array may, in some embodiments, be larger than 2N to reduce hash code collisions (e.g., a scenario in which no two distinct keys have the same scaled hash code such as those stored in the third array, the nextKeyIndex array). However, ensuring the size of the second array is less than or equal to 2N may ensure that minimal or minimized memory is used in the allocation of the second array. Given the above minimum sizes, the minimal amount of all elements in the six-array multimap is not greater than 5N+2M+5, resulting in an order (in Big O Notation) of O(M+N).

Furthermore, the total amount Q of memory necessary to store all the elements assuming the size of key type is p, size of value type is q and the index has integer type (size=4) is not greater than:

$$Q=(N+1)p+(4N+2)*4+(M+1)q+(M+1)*4=(p+16)N+(q+4)M+p+q+12 \text{ bytes}.$$

In some examples, such as Java 1.7, array allocation may require more free memory than necessary to fit the array. For example, if 50% more free memory is required, the memory allocation needed for a six-array multimap is:

$$Q+\max((N+1)p/2, (M+1)q/2, 2(M+1), 4N) \text{ bytes}.$$

Even further, according to example embodiments, determination of the scaled hash code is also relevant in optimizing performance and guaranteeing the required number of key-value pairs can be stored in the six-array multimap. A scaled hash code algorithm may be stored as computer program code on memory 26, for example, and performed by the processor 24.

The calculated value of scaled hash code forms the index in the second array, the array of start indexes of lists of keys having the same hash code. If a maximum expected number of keys is N, then the scaled index I could be calculated as:

I=hashcode(Key) & mask, where mask=2[log 2N]+1−1 and can be pre-calculated initially (set of 1 . . . 1b for select values from 0 to N). Hashcode( ) is an integer hash function, such as hashcode(key)=(int)(key xor (key/4294967296)). The hash code algorithm may therefore be dependent on a mask value. The mask value is used for scaling and may be calculated once during instantiation of the six-array multimap, and used in calculations to determine a scaled hash code.

For example, presume the maximum number of keys=N, and a length of the second array, startKeyIndex=L=min (E|E=$2^m$, E>N), a hash code function for the six-array multimap may be:

Hashcode(key)=(Key xor (Key shift bits right 32)) and ($2^m$−1). The result will be an integer in [0, L−1].

The apparatus 20 may also comprise means for adding a new key-value to the six-array multimap, according to example embodiments. For example, processor 24 and memory 26, may utilize two or more pointers to indices of the six-array multimap to enable efficient addition of new key-value pairs.

A first pointer, "freeKeyPosition" references an index of the first free cell in the first array, keys, where s next new key will be inserted. A second pointer, "freeValuePosition" references an index of the first free cell in the values where next new value could be inserted.

A general approach to adding a key-value pair (K,V) is provided in Table 5:

TABLE 5

Adding (K, V)

| Operation | Notes |
| --- | --- |
| 5.1 Calculate scaledIndex = H(K) | |
| 5.2 Iterate list of keys having same scaled hash code = H(K) | |
| 5.3 If K equals to some existing key from this list at index keyIndex | |
| 5.4 then addValueForExistingKey(keyIndex, V) | more detail provided in Table 7 |
| 5.5 else addNewPair(scaledIndex, startKeyIndex[scaledIndex], K, V) | more detail provided in Table 6 |

The last referenced method above, addNewPair, may be implemented according to the following algorithm or pseudo code in Table 6:

TABLE 6 addNewPair(scaledIndex, oldStartKeyIndex, K, V)

| Operation | Notes |
| --- | --- |
| 6.1 Set startKeyIndex[scaledIndex] = freeKeyPosition | points to new added key |
| 6.2 Set keys[freeKeyPosition] = K | add new key |
| 6.3 Set nextKeyIndex[freeKeyPosition] = oldStartKeyIndex | link new key to old last key |
| 6.4 Set lastValueIndex[freeKeyPosition] = freeValuePosition | points to new added value |
| 6.5 Set values[freeValuePosition] = V | add new value |
| 6.6 Set prevValueIndex[freeKeyPosition] = 0 | this is the last value in list |
| 6.7 Shift freeKeyPosition and freeValuePosition to next element | |

Figure 6:
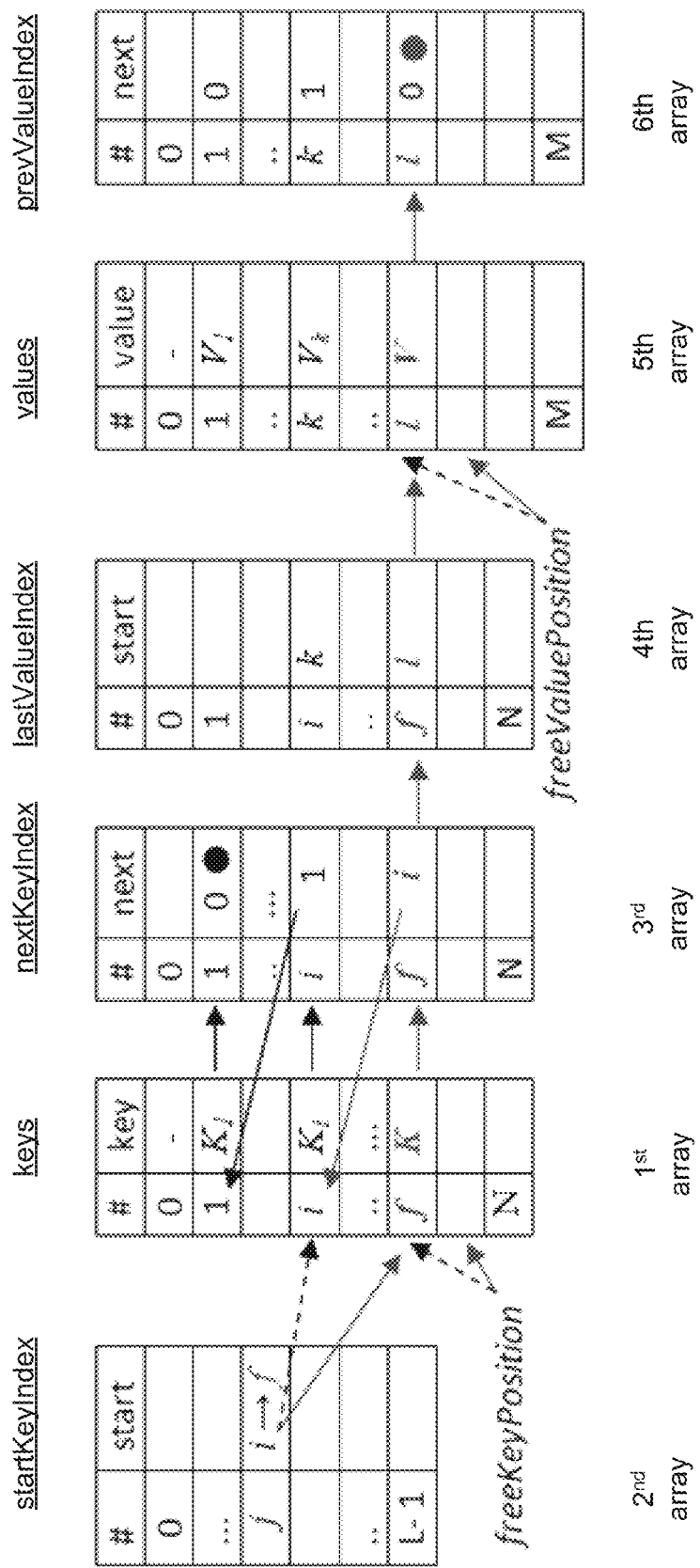

FIG. 6 illustrates an example of adding a new key-value pair (K,V) to the six-array multimap according to the above provided algorithm. Initial assumptions include scaledIndex=H(K)=j, oldStartKeyIndex=i, freeKeyPosition=f, and freeValuePosition=1.

Figure 7:
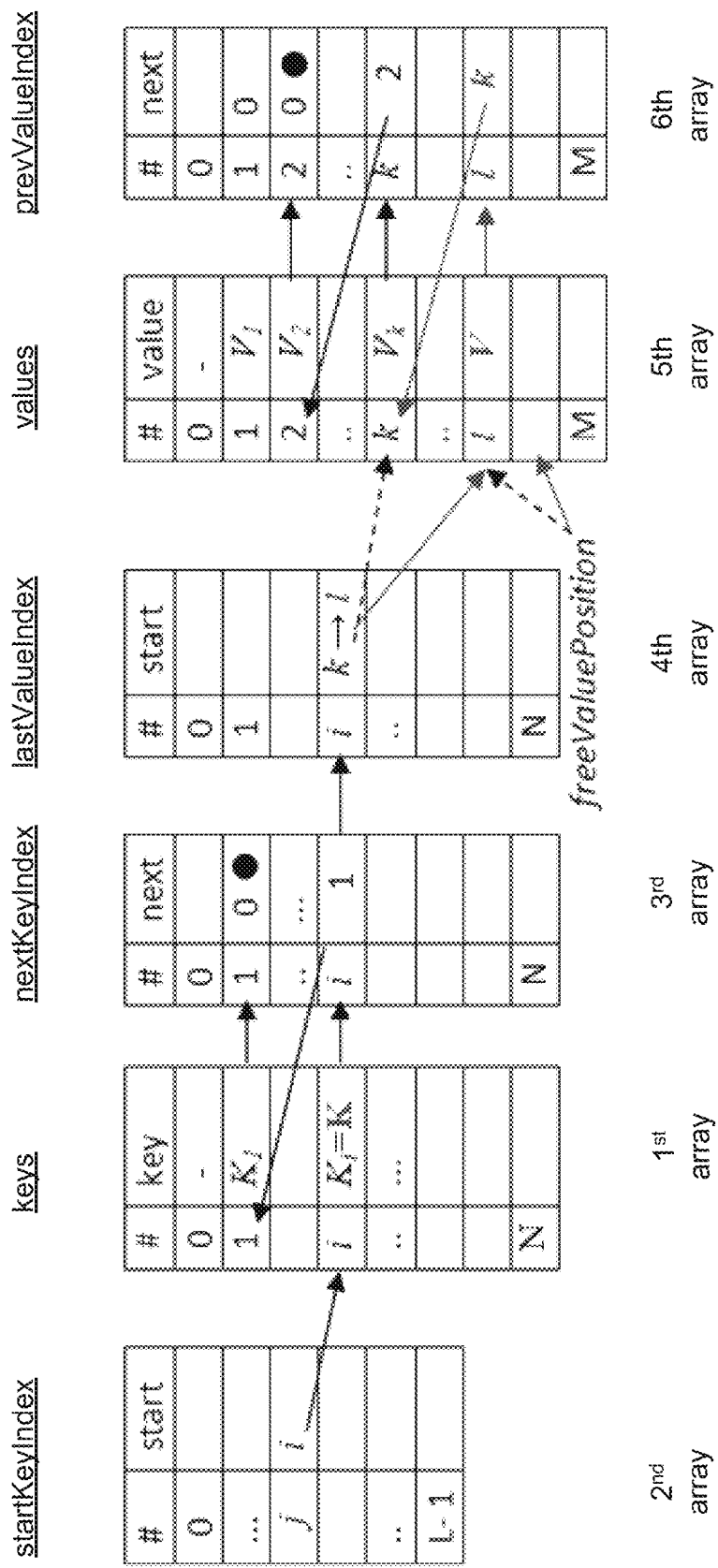

FIG. 7 illustrates an example of adding a new key-value pair (Ki,V) for which the key Ki is already present in the six-array multimap. Detail regarding operations 5.4 in Table 5 is provided below in Table 7, and illustrated in FIG. 7. The example of FIG. 7 begins with the assumptions K=Ki, H(K)=j, keyIndex=i, oldValueIndex=k, and freeValuePosition=1. The current association of keys to values before adding the new key-value pair is Ki→(V2, Vk). The association following the addition of (Ki,V) will be K=Ki→(V2, Vk, V).

TABLE 7 addValueForExistingKey(keyIndex, V)

| Operation | Notes |
| --- | --- |
| 7.1 Set oldValueIndex = lastValueIndex[keyIndex] | remember old last value index |
| 7.2 Set prevValueIndex[freeValuePosition] = oldValueIndex | link new value to old last value |
| 7.3 Set lastValueIndex[keyIndex] = freeValuePosition | points to new added value |
| 7.4 Set values[freeValuePosition] = V | add new value to array of values |
| 7.5 Shift freeValuePosition to next element | |

Having now described the addition of a key-value pair, apparatus 20 may also comprise means, such as processor 24 and memory 26, for removing a key and the key's associated values. The apparatus 20 may receive an indication to remove some values based on a specified key. The apparatus 20 may therefore update any of the arrays of the six-array multimap such that a subsequent search for the specified key, or retrieval of values associated with the specified key, returns no results. It will therefore be appreciated that while the terminology 'remove' is used to describe updates to the six-array multimap such that the key and its associated values cannot be located based on the provided search or retrieved implementations, the key and/or some of the values may physically remain in the respective first and fifth arrays, but are no longer related to the indices to allow retrieval of the associated values. Therefore, after a successful removal, a retrieve or search for the specified key will return no results, even if the key and/or associated values are still stored in the respective first and fifth arrays. The following Table 8 provides an algorithm or pseudo code for removing the key K and associated values (V1, . . . , Vm) from the six-array multimap

TABLE 8

Remove key K with associated values (V1, . . . , Vm)

| | Operation | Notes |
|---|---|---|
| 8.1 | Calculate scaledIndex = H(K) | scaled hash code |
| 8.2 | Iterate list of keys having same scaled hash code = H(K) | |
| 8.3 | If K equals to some existing key from this list at index keyIndex then | |
| 8.3.1 | Remove K from list of keys by adjusting nextKeyIndex elements | |
| 8.3.2 | If this list becomes empty then set startKeyIndex[scaledIndex] = 0 | |
| 8.3.3 | Set nextKeyIndex[keyIndex] = −1 | mark given key as deleted |
| 8.3.4 | Set prevValueIndex[. . .] = −1 for all associated values | optional |

Figure 8:
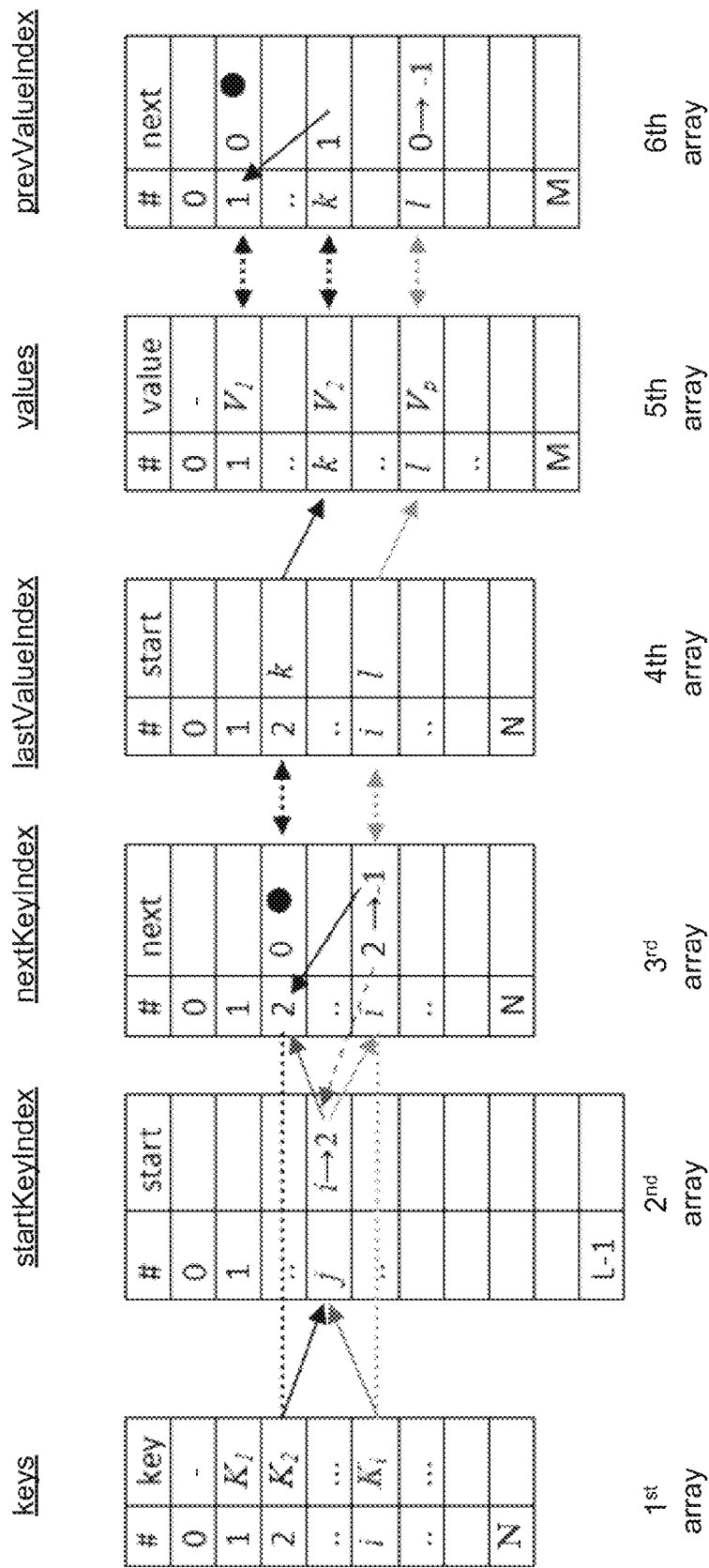

FIG. 8 illustrates an example of removing key Ki with all associated values (V1, . . . , Vm) according to the above algorithm. The following assumptions are made prior to removal: scaledIndex=H(Ki)=j, keyIndex=i, nextKeyIndex[i]=2, lastValueIndex[i]=1.

Following the removal according to the algorithm of Table 8, as illustrated in FIG. 8, startKeyIndex[scaledIndex]=2, nextKeyIndex[i]=−1, and lastValueIndex[1]=−1. The approach to remove the key and associated values will not increase the capacity of the six-array multimap instance, but will keep it in a consistent state and provides improved performance without additional memory usage.

The apparatus 20 may additionally comprise means, such as processor 24 and memory 26 to perform additional functions, such as, but not limited to, iterating all keys of the six-array multimap, iterating all values of the six-array multimap, and clearing the six-array multimap.

Table 9 provides a general approach for iterating all keys:

TABLE 9

Iterate all keys

| | Operation |
|---|---|
| 9.1 | for index from 1 to freeKeyPosition − 1: |
| 9.1.1 | if nextKeyIndex[index] ≥ 0 then process(keys[index]) |

In considering the above algorithm to iterate all keys, if keys will never be removed from the six-array multimap, then the check for nextKeyIndex could be skipped.

Table 10 provides a general approach for iterating all values:

TABLE 10

Iterate all values

| | Operation |
|---|---|
| 10.1 | for index from 1 to freeValuePosition − 1: |
| 10.1.1 | if prevValueIndex[index] ≥ 0 then process(values[index]) |

In considering the above algorithm to iterate all values, if keys will never be removed from the six-array multimap, then the check for prevValueIndex could be skipped.

Table 11 provides a general approach for clearing the six-array multimap:

TABLE 11

Clear six-array multimap

| | Operation |
|---|---|
| 11.1 | for each index from 1 . . . freeKeyPosition −1 set nextKeyIndex[index] = 0 |
| 11.1.1 | Set freeKeyPosition = freeValuePosition = 1 |

In considering the above algorithm to iterate all keys, it is not necessary to clear the values array. The values will be overwritten by new ones when new keys will be inserted.

The method, apparatus and computer program product provide numerous technical advantages including the conservation of processing resources and the associated power consumption otherwise expended to support larger sized memory allocations and larger order algorithms according to alternative implementations.

The six-array multimap enables add, remove, search, and iterate functionality without dynamically allocating additional memory. The insertion of a new key-value pair has algorithmic complexity O(1) in a case of no hash collision, (e.g., a scenario in which no two distinct keys have the same scaled hash code such as those stored in the third array, the nextKeyIndex array). The search for a key-value pair has an algorithmic complexity O(1) in the case of no hash collision. Iteration of a next value for a given key has algorithmic complexity O(1) in case of no hash collision.

Removal of a key and all associated values has algorithmic complexity O(1) in case of no hash collision and no iteration of all values, or O(M/N) when all values iteration is supported (where M is the number of unique keys, and N is the number of all unique values). The worst case algorithmic complexity is O(M) for operations (M−number of added keys) but is a rare scenario if a scaled hashing function is provided as described herein. The result is improved memory consumption and processing time when compared to alternative implementations, resulting in faster performance because only primitive types are used.

In some example embodiments, the six-array multimap can be expanded on structural types and fixed-length array types for keys and values.

FIG. 9 illustrates comparisons of insertion times of the six-array multimap and alternative implementations for storing keys and values of type Long when 1 gigabyte of memory is used. The insertion time for the six-array multimap increases linearly across the chart as the number of key-value pairs increases, while other implementations have insertion times that increase drastically, such as exponentially.

FIG. 10 illustrates comparisons of sizes of a data structure given 1 gigabyte of memory. The diagram reflects the maximum amount of pairs (Long key, Long value) which can be handled by the six-array multimap and by other alternative implementations. The six-array multimap requires less memory per key-value pair. Therefore, the maximum number of key-value pairs stored in a six-array multimap may significantly exceed that of alternative implementations.

As described above, FIG. 4 illustrates a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computer program product comprising at least one non-transitory computer-readable storage medium having computer-executable program code instructions stored therein, the computer-executable program code instructions comprising program code instructions to:
   receive an indication of a key for which to identify a corresponding value, wherein the key is an element associated with a key index of a first array;
   calculate a scaled hash code of the key, wherein the scaled hash code is calculated based on at least a maximum number of key value pairs to be stored;
   access a second array to identify a third array start index based on the calculated scaled hash code;
   traverse a plurality of key indices in the third array to determine the key index with which the key is associated, wherein the traversal begins from the identified third array start index;
   access a fourth array based on the determined key index to identify a last value index of a list of values in a fifth array;
   traverse a plurality of value indices in a sixth array, beginning at the identified last value index, to determine an actual value index by which to access the corresponding value in the fifth array; and
   cause the corresponding value to be returned in response to a request for the value,
   wherein the arrays are of primitive types and are allocated upon instantiation.

2. The computer program product according to claim 1, wherein each key index of the plurality of traversed key indices in the third array has an associated key having a same scaled hash code as the calculated scaled hash code, and the traversal continues until an instance that an arbitrary key accessed in the first array based on the traversed key index equals the key.

3. The computer program product according to claim 1, wherein each value index of the plurality of traversed value indices of the sixth array have associated values in the fifth array that are associated with the key.

4. The computer program product according to claim 1, wherein a number of elements in the first array is one greater than a number of unique keys, and a number of elements in the fifth array is one greater than the number of unique values.

5. The computer program product according to claim 1, wherein the computer-executable program code instructions further comprise program code instructions to:
   receive an indication of a new key-value pair to be added;
   add a new value to the fifth array in a position based on a freeValuePosition pointer; and update any of the first array, second array, third array, fourth array, or sixth array accordingly.

6. The computer program product according to claim 1, wherein the computer-executable program code instructions further comprise program code instructions to:
receive an indication of a specified key for which the specified key and associated values of the specified key are to be removed;
and
update any of the first array, second array, third array, fourth array, fifth array or sixth array such that a search for the specified key returns no results.

7. The computer program product according to claim 1, wherein an insertion time of a new key-value pair is a linear function of a total number of key-value pairs.

8. An apparatus comprising at least one processor and at least one memory including computer program code, the at least one memory and the computer program code configured to, with the processor, cause the apparatus to at least:
receive an indication of a key for which to identify a corresponding value, wherein the key is an element associated with a key index of a first array;
calculate a scaled hash code of the key, wherein the scaled hash code is calculated based on at least a maximum number of key value pairs to be stored;
access a second array to identify a third array start index based on the calculated scaled hash code;
traverse a plurality of key indices in the third array to determine the key index with which the key is associated, wherein the traversal begins from the identified third array start index;
access a fourth array based on the determined key index to identify a last value index of a list of values in a fifth array;
traverse a plurality of value indices in a sixth array, beginning at the identified last value index, to determine an actual value index by which to access the corresponding value in the fifth array; and
cause the corresponding value to be returned in response to a request for the value,
wherein the arrays are of primitive types and are allocated upon instantiation.

9. The apparatus according to claim 8, wherein each key index of the plurality of traversed key indices in the third array has an associated key having a same scaled hash code as the calculated scaled hash code, and the traversal continues until an instance that an arbitrary key accessed in the first array based on the traversed key index equals the key.

10. The apparatus according to claim 8, wherein each value index of the plurality of traversed value indices of the sixth array have associated values in the fifth array that are associated with the key.

11. The apparatus according to claim 8, wherein a number of elements in the first array is one greater than a number of unique keys, and a number of elements in the fifth array is one greater than the number of unique values.

12. The apparatus according to claim 8, wherein the at least one memory and the computer program code are configured to, with the processor, cause the apparatus to at least:
receive an indication of a new key-value pair to be added;
add a new value to the fifth array in a position based on a freeValuePosition pointer; and
update any of the first array, second array, third array, fourth array, or sixth array accordingly.

13. The apparatus according to claim 8, wherein the at least one memory and the computer program code are configured to, with the processor, cause the apparatus to at least:
receive an indication of a specified key for which the specified key and associated values of the specified key are to be removed; and
update any of the first array, second array, third array, fourth array, fifth array or sixth array such that a search for the specified key returns no results.

14. The apparatus according to claim 8, wherein an insertion time of a new key-value pair is a linear function of a total number of key-value pairs.

15. A method comprising:
receiving an indication of a key for which to identify a corresponding value, wherein the key is an element associated with a key index of a first array;
with a processor, calculating a scaled hash code of the key, wherein the scaled hash code is calculated based on at least a maximum number of key value pairs to be stored;
accessing a second array to identify a third array start index based on the calculated scaled hash code;
traversing a plurality of key indices in the third array to determine the key index with which the key is associated, wherein the traversal begins from the identified third array start index;
accessing a fourth array based on the determined key index to identify a last value index of a list of values in a fifth array;
traversing a plurality of value indices in a sixth array, beginning at the identified last value index, to determine an actual value index by which to access the corresponding value in the fifth array; and
causing the corresponding value to be returned in response to a request for the value,
wherein the arrays are of primitive types and are allocated upon instantiation.

16. The method according to claim 15, wherein each key index of the plurality of traversed key indices in the third array has an associated key having a same scaled hash code as the calculated scaled hash code, and the traversal continues until an instance that an arbitrary key accessed in the first array based on the traversed key index equals the key.

17. The method according to claim 15, wherein each value index of the plurality of traversed value indices of the sixth array have associated values in the fifth array that are associated with the key.

18. The method according to claim 15, wherein a number of elements in the first array is one greater than a number of unique keys, and a number of elements in the fifth array is one greater than the number of unique values.

19. The method according to claim 15, further comprising:
receiving an indication of a new key-value pair to be added;
adding a new value to the fifth array in a position based on a freeValuePosition pointer; and
updating any of the first array, second array, third array, fourth array, or sixth array accordingly.

20. An apparatus comprising:
means for receiving an indication of a key for which to identify a corresponding value, wherein the key is an element associated with a key index of a first array;

means for calculating a scaled hash code of the key, wherein the scaled hash code is calculated based on at least a maximum number of key value pairs to be stored;

means for accessing a second array to identify a third array start index based on the calculated scaled hash code;

means for traversing a plurality of key indices in the third array to determine the key index with which the key is associated, wherein the traversal begins from the identified third array start index;

means for accessing a fourth array based on the determined key index to identify a last value index of a list of values in a fifth array;

means for traversing a plurality of value indices in a sixth array, beginning at the identified last value index, to determine an actual value index by which to access the corresponding value in the fifth array; and means for causing the corresponding value to be returned in response to a request for the value, wherein the arrays are of primitive types and are allocated upon instantiation.

* * * * *